United States Patent
Trachier

[11] Patent Number: 5,914,881
[45] Date of Patent: Jun. 22, 1999

[54] PROGRAMMABLE SPEED CONTROLLER FOR A MILLING DEVICE

[76] Inventor: Fredrick J. Trachier, 3500 Yacht Club Court, Arlington, Tex. 76016

[21] Appl. No.: 08/841,458

[22] Filed: Apr. 22, 1997

[51] Int. Cl.[6] .................................................. G06F 19/00
[52] U.S. Cl. ...................................................... 364/474.02
[58] Field of Search ........................ 364/474.02, 474.11, 364/474.3, 474.23; 409/79, 67

[56] References Cited

U.S. PATENT DOCUMENTS

| | | | |
|---|---|---|---|
| 2,942,781 | 6/1960 | Abatemarco | 235/179 |
| 4,698,773 | 10/1987 | Jeppsson | 364/474.02 |
| 4,707,793 | 11/1987 | Anderson | 364/474.3 |
| 4,862,379 | 8/1989 | Fujimoto | 364/474.11 |
| 4,887,221 | 12/1989 | Davis et al. | 364/474.23 |
| 5,136,903 | 8/1992 | Hibi | 82/1.11 |

*Primary Examiner*—William Grant
*Assistant Examiner*—Chad Rapp
*Attorney, Agent, or Firm*—James G. O'Boyle; Mitchell B. Wasson

[57] ABSTRACT

A programmable command module for inputting a surface foot rating parameter into a device for controlling the spindle speed of a cutting tool. Based upon the surface foot rating, the proper speed of the spindle is determined with respect to a particular cutting tool parameter, such as the tool's diameter. The spindle speed setting is transmitted to an AC inverter which in turn controls the operation of an AC motor for rotating the spindle at its proper speed.

7 Claims, 1 Drawing Sheet

PROGRAMMABLE SPEED CONTROLLER FOR A MILLING DEVICE

FIELD OF THE INVENTION

The present invention is directed to a device for determining the proper revolutions per minute (RPM) for cutting or milling a particular material.

BACKGROUND OF THE INVENTION

When conducting machining operations on a particular workpiece, it is important to determine the correct RPM of the cutting tool which is based upon surface foot rating of the material constituting the workpiece. It is well known that the surface speed of the material, calculated in a surface foot rating, has a definite relationship with respect to the diameter of the cutting tool and the RPM of the cutting machine. Various tables have been developed showing this relationship. Therefore, utilizing these tables for specific surface speed would convey information relating to the proper diameter of the cutting tool and the speed of rotation of the cutting tool. Once this information was determined, the operator of the machine would select the diameter of the cutting tool, insert it into the machine, then would manually set the proper RPM of the spindle to which the cutting tool is attached.

Furthermore, if the operator wishes to perform several successive operations on the workpiece utilizing tools of different diameters, the proper RPM must be calculated or read from the table for each of the tools. For example, if the operator wishes to drill a one-half inch diameter hole in a material, he must calculate the RPM based on the diameter of the cutter and the surface foot rating of the material to be machined. Subsequently, if the operator wishes to drill a one-inch diameter hole in the same material, the operator must change the RPM of the spindle, based upon the calculation of the surface feet per minute of the material to be machined. Not only would these calculations have to be performed, they must be retained by the operator so that he would not have to calculate the RPM of the spindle if the same operations were to be performed on more than one workpiece.

Most manual knee-type milling machines utilized at the present time employ two methods of changing the spindle speed (RPM). The first method would include a mechanical variable-speed drive in which the operator changes the RPM by a crank handle which, in turn, changes the belt position on a bellows-type pulley arrangement. A mechanical dial associated with the milling machine would display the particular spindle speed. Unfortunately, although the particular speed of the spindle would be displayed, the actual spindle speed could vary substantially, based upon the mechanics of the design.

The second method which is presently utilized for changing spindle speeds would employ a step pulley. Although this step pulley would provide a more accurate spindle speed, it is limited to a selection of only several discrete RPMs.

A number of prior art patents have issued relating in general to the problem of determining the proper operating parameters for a particular endeavor. For example, U.S. Pat. No. 2,942,781 issued to Abatemarco relates to calculating and analyzing devices which are adapted to utilize data obtained from standard tables to determine optimum operating conditions. In a machine tool such as a lathe or milling machine, the fundamental relationship between various parameters such as time, length of cut, feed rate, rotary speed of the work or cutter, the number of teeth on the cutter, the chip load per tooth per revolution as well as the relative surface speed of the cutter and work and the diameter of the cutter or work are known. Therefore, if one or more of these parameters are inputted into the standard data analyzer shown in the Abatemarco patent, parameters dependent upon those which were introduced into the analyzer can then be determined. However, the calculator device of the Abatemarco patent has no control over the actual speed of a milling machine spindle.

Similarly, U.S. Pat. No. 4,707,793 issued to Anderson describes a method of determining the feed rate and cutting speed for cutting metal by inputting various parameters into a calculator. Any calculations produced by the Anderson calculator would have to be manually inputted into a particular machine.

U.S. Pat. No. 5,136,903 issued to Hibi describes a method of automatically determining a machining range such as the best chucking point on a workpiece machine utilizing a CNC program. However, as was true with respect to the Anderson and Abatemarco patents, this patent does not deal with the peripheral speed of a rotating cutter used in a milling machine.

U.S. Pat. No. 4,698,773 issued to Jeppsson is directed to a system for adaptively limiting the feed rate of a milling machine's positioning axes during a milling operation. Strain gauges are employed on a numerically controlled milling machine which senses the load on the cutting tool. A signal is then sent to a device for automatically overriding the program feed rate to maintain a peak side load on the cutting tool. As was true with respect to the above-noted patents, the Jeppsson device does not control the speed of the spindle but only overrides the feed rate.

SUMMARY OF THE INVENTION

The disadvantages of the prior art are addressed by the present invention which would remove all guess work and manual calculations from machining on the type of milling machines in which various workpieces are treated. (Although this invention will be applied to other operations, i.e. lathes, etc., for the present time, the milling machine is addressed here.) The operator would be only required to know the surface foot rating of the material to be machined. This parameter is entered into the programmable speed controller of the present invention which would display the correct spindle speed (RPM) for the diameter of the cutter the operator selects. For example, when the operator rotates an analog variable-speed dial, the displayed RPM increases or decreases, based upon the diameter of the cutting tool which is simultaneously displayed. Therefore, according to the present invention, once the surface foot rating is entered into the device and a cutting tool having a particular diameter is selected, the speed of the spindle would also be displayed.

The speed of the spindle for a selected cutting tool is then converted into a direct current (DC) value which is transmitted to an alternating current (AC) inverter. The DC value of the particular spindle speed is then converted into an AC motor which rotates the spindle. This spindle speed is directly related to the AC output of the AC inverter which in turn operates the AC motor at the same value to produce a very accurate spindle speed.

Further features, advantages, and benefits of the present invention will be found in and perceived from the ensuing detailed description of the preferred embodiments of the present invention. The drawing which accompanies the disclosure illustrates the preferred embodiments in the best mode contemplated at this time for carrying out the invention.

DETAILED DESCRIPTION OF THE INVENTION

Figure 1:
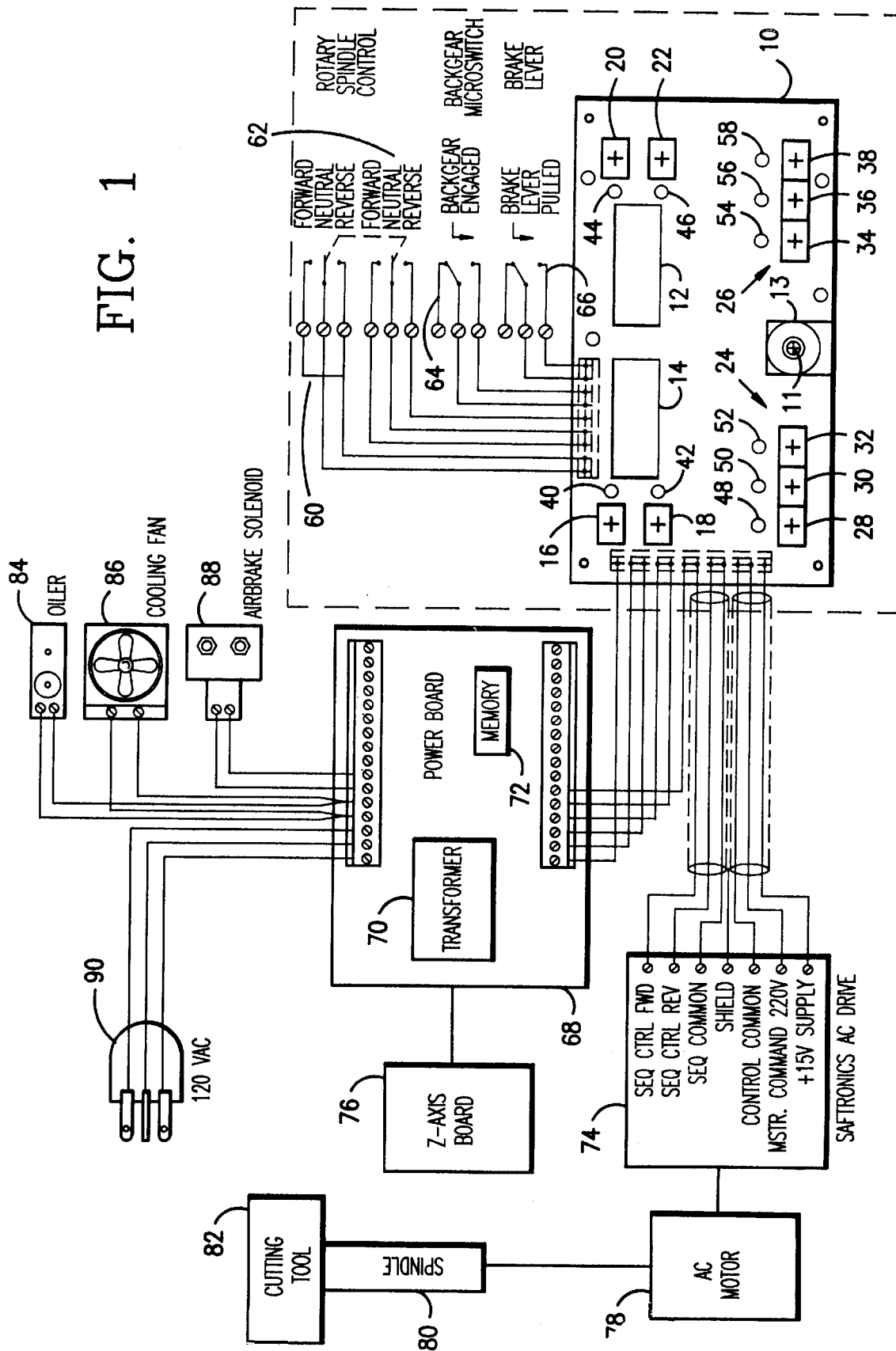
FIG. 1 is a schematic drawing of the programmable speed controller of the present invention.

The present invention as illustrated with respect to FIG. 1 includes a programmable command module provided with a display and input device 10, a power board 68, and an AC inverter 74. The inverter 74 controls the operation of an AC motor 78 which is provided with a rotating spindle 80 having a cutting tool 82 attached thereto. An oiler 84, a cooling fan 86 and an airbrake solenoid 88 are also provided.

The programmable speed controller particularly in conjunction with the display and input means 10 and the power board 68 is designed to store any division of an analog voltage into memory. This analog voltage can either be AC or DC. The present invention is also designed to store an unlimited number of analog voltage divisions and to recall these voltages initiating one or more switches including an infinitely variable dial. The infinitely variable switch, such as dial 13 is used to regulate the divided analog voltage which is displayed on displays 12 and 14. These displays could be a liquid crystal display or any other type of display known in the art. Once a particular parameter is determined and displayed in either of the displays 12 or 14, it can be used to operate a particular device, such as a spindle having a cutting device thereon. Additionally, these and other parameters can be introduced into the memory for use at a later time. Although the type of external device which is attached to the input and display device 12 as well as the power board 68 is virtually unlimited, the present invention shall now be described with respect to an AC inverter 74. One such AC inverter is manufactured by Saftronics Inc. Other AC inverters are manufactured by General Electric, Dayton as well as many other manufacturers. Most AC motors operate at 60 hertz and, for ease of discussion, we will assume that 1 hertz equals 30 RPM. Therefore, 60 hertz would equal 1800 RPM. Furthermore, for ease of explanation, we will assume that an AC inverter would operate in the range of 60 to 180 hertz.

For example, if an AC inverter is set at 90 hertz×30 it would equal a maximum of 2700 RPM on an attached AC motor. If that same AC inverter or a different AC inverter would operate at 180 hertz, the maximum speed would be 5400 RPM (180 hertz×30) on the attached AC motor. Regardless of the hertz setting the user sets, an AC inverter would normally accept a 0–10 DC volt signal which is divided equally within the hertz range selected. For instance, in the example given above in which the maximum speed is 2700 RPM, any voltage between 0–10 DC would produce a given RPM to the attached AC motor.

Using an example in the metal working industry, materials to be machined have been given an industry standard of machinability in a surface foot rating. These ratings relate to the peripheral speed of a rotating tool, based upon the diameter of the cutting tool. For example, as taken from the second edition of The Machining Data Handbook by the Machinability Data Center, Metcut Research Associates Inc. of Cincinnati, Ohio, the surface route rating of 6061-T6 aluminum alloy Wrought is between 800 and 1200 surface foot per minute. Additionally, 303 Austenitic stainless steel would have a surface foot rating of 130 to 160 surface foot per minute. Since the circumference in feet multiplied by the surface foot rating equals the RPM of the spindle, mathematical computations would indicate that a one foot diameter cutter having a surface foot rating of 100 should be cut by a spindle rotating at 314.16 RPM.

Because most materials have a recommended machining surface foot rating, the operator must calculate the correct RPM based upon a surface foot rating and the diameter of the cutter size selected. This calculation would enable the operator to determine the correct RPM setting for the machine being utilized.

Normal accepted machining practice is to select a material surface foot rating, and then to calculate the diameter of the cutting tool into this surface foot, which would produce a recommended speed for the cutter diameter. The operator would then select the closest speed available on the machine which is used. Since most users do not have the knowledge or do not take the time to calculate this important function of machining, excessive tool wear and tool breakage occurs, which is one of the most expensive costs related to machining.

The present invention is designed to be connected to a cutting tool through the AC inverter as an after market item or can be initially incorporated into the machining tool. In either instance, the present invention is programmed utilizing a solid state memory 72 provided on the power board 68 to determine the proper spindle speed (RPM) and consequently the proper diameter size of the cutting tool based upon a surface foot rating which would be manually introduced to the machine by the operator. This programming can be accomplished when the present invention is built as well as at a later time. When the programming has been accomplished, inputting of the surface foot rating would automatically result in the correct determination of both the spindle speed based on the cutting tool diameter selected.

As shown in FIG. 1, the display and input device 10 includes various switches and displays allowing the operator to utilize the present invention. This display and input device can be provided directly upon the milling machine or in a self-contained unit directly attached to the milling machine. The control and display unit would include two displays 12 and 14. These displays would display various parameters relating to the cutter speed and the cutter diameter. It is noted that more than two displays can be included if additional parameters need be monitored. A power switch 16 is provided for applying DC power to the present invention. A 120 volt AC plug 90 is connected to the power board 68 for attachment to a standard wall outlet. A standard transformer 70 is included in the power board for converting the AC voltage to DC voltage which can then be utilized by the controller device of the present invention. Minimum and maximum RPM levels can be introduced into the controller when the controller is manufactured or by the individual user. If these RPM levels have not been set or have been lost, the controller can enter set RPM limits. If the spindle 80 is controlled by an air brake (not shown), a brake button 18 would control the actuation of this air brake through an air brake solenoid 88 connected to the power board 68. When the button is ON, the air brake or brakes are released when spindle controls 60, 62 are set to either forward or reverse and applied automatically when the brake lever is hit. When the brake button is in the OFF setting, the brakes are not applied when a brake lever 66 is engaged. The power board 68 also includes a processing network for determining the proper cutting tool RPM based upon the parameter entered into the device as well as converting an output into a percentage of the range of the invertor.

The present invention can operate in either the "drill press", "manual" or "automatic" modes. When the controller of the present invention is first initiated, the controller would be in the "drill press" mode. This is the simplest operating mode. No calculations for surface feed/minute are made or displayed. The spindle RPM is displayed as a variable rotating dial 13 is turned. In this mode, a particular RPM value is displayed in either of the displays 12 or 14. The particular RPM value which is selected would automatically divide a DC voltage, such as 10 volts into the appropriate voltage which would be applied to the AC inverter 72, which would then operate the AC motor 78 and the spindle 80 at the proper rotation speed.

The present invention can also operate in the "manual" mode. In operation, when manual switch 20 is depressed, or a light emitting diode (LED) 44 would blink and one of the displays, such as 12, would prompt the user to enter a surface foot rating. Rotating dial 13 would allow entry of the proper surface foot rating by rotating the dial 13 in either a clockwise or counterclockwise direction which would increase or decrease the reading in display 12. When the proper surface foot is displayed, the manual switch 20 would be depressed and held for a predetermined amount of time. At this point, the display 14 would display a particular RPM value and display 12 would display a particular too size diameter. At this point, when the operator would rotate the dial 13 in either a clockwise or counterclockwise direction, the RPM value shown in display 14 and the tool size shown in display 12 would increase or decrease. Therefore, if the user would require a one inch diameter cutting tool, the user would rotate the dial 13 for this tool size shown in display 12. At that point, the proper spindle speed associated with this tool size and the surface foot rating would be illuminated in display 14. The operator would then only need to initiate the AC motor 78 which would then rotate the spindle 80 having a cutting tool 82 thereon at the proper speed based also upon the influence of the AC inverter 74. With the programmable command module of the present invention, the operator has the ability to select any diameter of cutting tool by rotating the dial 13 and the AC motor 78 will always seek the correct RPM based upon the programmed surface foot.

The present invention can also operate in the "automatic" mode by depressing the automatic switch 22. At this point, LED 46 would blink and the display 14 would ask for a surface foot entry. The operator would then rotate the dial 13 to display the desired surface foot reading in the display 12. The operator would then depress and hold the automatic switch 22 for a predetermined amount of time to store the surface foot reading in memory. The automatic operation would allow one or more tool settings to be automatically included in the command module's memory. These memory functions are programmed utilizing the six memory buttons 28, 30, 32, 34, 36 and 38 shown in FIG. 1. Obviously, more or less tool settings can be utilized. Each of the memory buttons have LEDs 48, 50, 52, 54, 56 and 58 associated with them. At this point, the operator would press one of the memory switches and its respective LED would then begin to blink. The operator would then rotate dial 13 to display the desired tool size in display 12. By depressing and holding a memory switch, the tool size would be inputted into the memory 72. This procedure can be done for one or more tool sizes. After all of the tool sizes have been properly entered into the controller of the present invention, the operator would depress one of the memory buttons 28, 30, 32, 34, 36 or 38 which would display the programmed tool size in display window 12 as well as the appropriate RPM reading in display 14. At this point, the operator would attach the selected tool 82 to the spindle 80 which would rotate at the proper speed based upon the tool size and the surface foot rating.

It is noted that the present invention would allow operation of the spindle in the backgear mode. A backgear microswitch 64 is associated with the present invention and when this switch is selected, the spindle speed would be reduced at a 10:1 ratio. LEDs 40, 42, 44 and 46 are associated with the power switch 16, the brake switch 18, the manual switch 20 and the automatic switch 22 respectively. These lights would be utilized to indicate whether either of these switches are engaged or, if LED switches 44 and 46 are flashing, various settings can be entered into the controller. Information which has been entered into the memory of the present invention can be checked to insure the accuracy of this information. For example, if the surface foot rating is to be checked, the automatic button 44 is depressed until the surface foot rating is displayed. Short taps on each respective preset button 28, 30, 32, 34, 36 or 38 will recall each loaded tool and the surface foot rating for that tool. Similarly, if the automatic button 22 is depressed until the RPM and tool size are displayed in displays 12 and 14, short taps on the proper preset buttons will recall the loaded tool and spindle speed for that location.

Maximum and minimum RPM settings are maintained in the non-volatile memory of the controller board of the present invention. When the controller is first turned ON, it would check the integrity of this information. If a problem is detected, the controller would automatically enter the set RPM limit mode. Maximum and minimum RPM values must then be set before the controller would operate. In this situation, the rotary spindle switches 60 and 62 must be in neutral and the brake lever 66 must be free. The brake control button 18 would then be depressed while the power button 16 is depressed. The display will then show 0000 and LED 44 associated with the manual control 20 would flash indicating that you have entered the special set up mode. At this point, the knob 13 is rotated until the desired maximum RPM is shown in one of the displays 12 or 14. The maximum RPM setting for backgear is automatically entered as ¹⁄₁₀th of the displayed RPM. The manual button 20 is then pressed to lock in this new maximum RPM. The LED 46 associated with the automatic button 22 would now flash and the display would show 0000. Knob 13 is then rotated to enter the desired minimum RPM which is also displayed in one of the displays 12 or 14. The automatic button 22 is pressed to lock in this setting. As was true with respect to the maximum RPM setting, the minimum backgear setting is automatically set at ¹⁄₁₀th of the displayed RPM.

During the machining or cutting process, the distance between the cutting tool and the workpiece can be displayed on one of the displays 12 or 14. A Z-axis daughter board 76 is attached to the power board 68 are the movement of the spindle toward the workpiece will be sensed and transmitted between the cutting device, the power board 68 and the display unit. The display would show the distance between the workpiece and the cutting tool. As the distance between the cutting tool and workpiece decreases, the value in one of the displays 12 and 14 would also decrease until it reaches a zero point. Once this zero is passed, the value shown on the display would increase, showing the depth of the feed. The display is enabled by pushing a button 11 provided within the rotary dial 13.

Having now described the invention in detail in accordance with the requirements of the patent statutes, those skilled in this art would have no difficulty in making changes and modifications in the individual parts or the relative assembly in order to meet specific requirements or conditions. Such changes and modifications may be made without departing from the scope and spirit of the invention, as set forth in the following claims.

What is claimed is:

1. A machine for cutting a workpiece, with a cutting tool, comprising:
   a spindle connected to the tool;
   a microprocessor provided with a memory containing relationships between the surface foot rating of the workpiece, the diameter of the cutting tool and the RPM of the spindle;
   a display and input device in communication with said microprocessor provided with a means for inputting the surface foot rating of the workpiece and the diameter of the cutting tool with respect to the surface foot rating of the workpiece;
   conversion means provided in said microprocessor for converting the RPM of the spindle into a specific DC voltage value within a range of DC voltage values;
   an inverter connected to said microprocessor for inverting said specific DC voltage to produce a specific AC voltage;
   an AC motor connected to said inverter of said spindle; and wherein
   said spindle rotates at the specific RPM of the tool calculated by said microprocessor based upon the inputted surface foot rating of the workpiece and the diameter of the cutting tool.

2. The machine in accordance with claim 1, wherein said display and input device is provided with first and second displays for displaying said RPM of the spindle and said inputted tool diameter.

3. The machine in accordance with claim 2 wherein said display and input device contains a means for changing said first and second displays to display relationships between spindle speed and cutting tool size for a given surface foot rating.

4. The machine in accordance with claim 2 wherein said display and input device includes a means for storing and recalling particular cutting tool sizes based upon a particular surface foot rating.

5. The machine in accordance with claim 2, further including a device for sensing the distance between the cutting tool and the workpiece and displaying this distance on the same display and input device which displays said RPM of the spindle and said tool diameter.

6. The method of rotating a cutter provided on a spindle powered by an AC motor connected to an inverter at a precise speed to cut a workpiece, comprising the steps of:
   determining the surface foot rating of the material to be used for the workpiece;
   entering said surface foot rating into a first display of a display device provided with first and second displays connected to a microprocessor having a memory and also connected to a conversion device;
   entering a particular cutting tool diameter into said display;
   noting the correct spindle RPM calculated by said microprocessor based upon the surface foot rating and tool diameter entered into said display device;
   affixing a cutting tool having the diameter entered into said display device to aid spindle;
   initiating the AC motor; and
   moving the cutting tool affixed to the spindle until it cuts the workpiece;
   wherein the calculated spindle RPM is converted from a DC voltage to an AC voltage corresponding to the exact spindle RPM, said AC voltage powering the AC motor at the proper speed.

7. The method in accordance with claim 6 further including the step of storing in memory a plurality of spindle speeds and cutter diameters based on particular surface foot rating.

* * * * *